Figure 1:
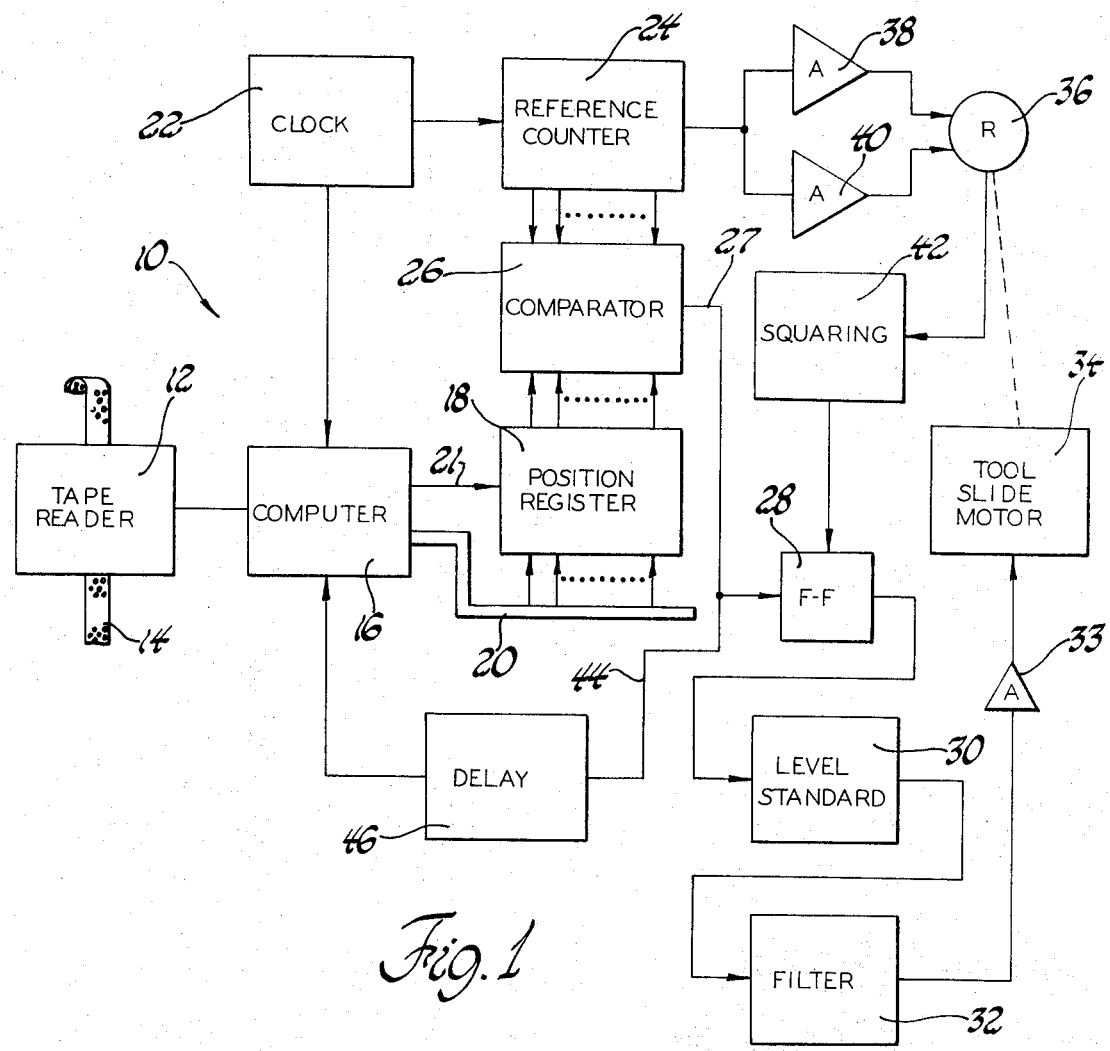

United States Patent

[15] 3,676,650

Henegar

[45] July 11, 1972

[54] NUMERICAL CONTROL SYSTEM USING POSITION NUMBER GENERATOR

[72] Inventor: Hubert B. Henegar, Detroit, Mich.
[73] Assignee: The Bendix Corporation
[22] Filed: Oct. 5, 1970
[21] Appl. No.: 77,770

[52] U.S. Cl. .................235/151.11, 318/608, 235/92 MP, 340/347 SY
[51] Int. Cl. .................................................G05b 19/30
[58] Field of Search..........318/569, 601; 235/151.11, 92 MP

[56] References Cited

UNITED STATES PATENTS 3,400,314  9/1968  Wilson...................................318/603

Primary Examiner—Eugene G. Botz
Attorney—McGlynn, Reising, Milton & Ethington, William F. Thornton and Plante, Hartz, Smith and Thompson

[57] ABSTRACT

A variable phase signal generator for driving a phase analog loop in a numerical control system wherein a computer responds to program data to output position number sequences and digital means are provided for converting the numbers in the sequences to a variable phase pulse train.

17 Claims, 2 Drawing Figures

INVENTOR
Hubert B. Henegar
BY
Barnard, McGlynn & Reising
ATTORNEYS

NUMERICAL CONTROL SYSTEM USING POSITION NUMBER GENERATOR

This invention relates to numerical control systems for directing the displacement of a movable element such as a tool slide and particularly to a system for generating displacement control signals suitable for application to a phase-analog type of displacement control loop.

It is common in numerical control systems for milling machines, drafting machines, plotters and the like to employ a phase analog servo loop which is responsive to command pulses to position the controllable element. The phase analog servo loop normally include a displacement producing device such as a motor and means for monitoring the displacement of the controlled element, such means usually including one or more resolvers or similar devices for producing a cyclical signal which is variable in phase to indicate part displacement. Typically, the command pulses which are applied as the input signal to the phase analog loop are generated by decoding stored program data and applying signals to an interpolator such as a digital differential analyzer. The interpolator, a relatively sophisticated and costly device, produces a train of command pulses which, after further processing, determine the phase of a squarewave which is applied to the phase analog servo loop.

In accordance with the present invention, input pulses for the actuation of the phase analog servo loop in a numerical control system are provided without the use of an interpolator. In general, this is accomplished by generating from program data a sequence of digital position quantities such as binary numbers which sequence represents the desired displacement characteristics of a controlled element, and means responsive to the digital position quantities and the incremental variations therebetween for producing related displacement of the controlled element, such means employing a phase analog servo loop.

In a specific form of the invention, position quantities or as more specifically referred to herein, multiple bit "position numbers", are generated in response to stored program data by a digital computer, the digital position numbers occurring in a sequence having a relatively slow periodicity as compared to the rate at which interpolator command pulses are typically generated in prior art systems. The periodically occurring position numbers are compared, preferably digitally, to a cyclically and periodically varying reference quantity such that when a predetermined relationship between the position numbers and the reference quantity, e.g. numerical equivalence, occurs, a control signal pulse is generated. Both the position numbers and the reference quantity cycles occur at the same repetition rate and, thus, a series or sequence of control pulses is generated, the phase relationship or time spacing between this series or sequence of pulses being an analog representation of the displacement quantities which are indicated in the stored program. Accordingly, the series of pulses when applied to a phase analog servo loop of a type well known to those skilled in the art, performs the same function as command pulses generated by means of interpolators.

Figure 2:
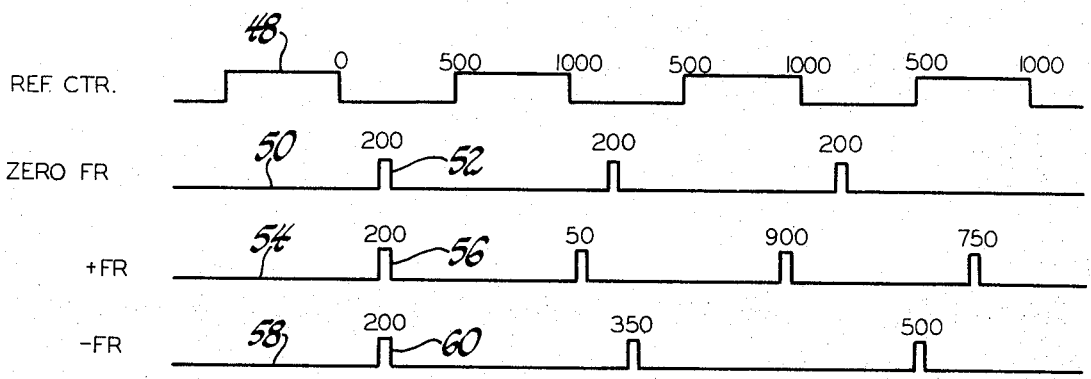

The various features and advantages of the invention will become more apparent upon reading the following specification which specification describes an illustrative embodiment to the invention. The specification is to be taken with the accompanying figures of which:

FIG. 1 is a block diagram of the illustrative system embodying the invention; and, FIG. 2 is a waveform diagram useful in explaining the operation of the embodiment of FIG. 1.

Referring now to FIG. 1, the invention is shown embodied in a numerical control system 10 employing a conventional eight-channel photoelectric tape reader 12 for reading part program data from a punched plastic tape 14 of standard configuration. The letter and number characters which are read from tape 14 by tape reader 12 are input to a general-purpose digital computer which is programmed as hereinafter described to perform a data transformation function. Computer 16 outputs position numbers at a rate of approximately 200 numbers per second on a parallel line output bus 20 for application to a 10-bit static position register 18. The register 18 is cleared prior to the application of position numbers by means of a computer output line 21. The position numbers may be output in binary or BCD form all digits of each number being simultaneously loaded into the 10-bit positions of register 18. In the example hereinafter described, the position numbers may be of any integral value between 0 and 999. A clock 22 which may be internal or external relative to the computer 16 establishes the basic timing function for the system 10 and is connected to computer 16 as well as to a reference counter 24. The reference counter 24 operates to divide the 200 KC signal from the clock 22 into a 200 cycle per second squarewave which is applied through amplifiers 38 and 40 to a resolver 36 which forms part of a phase analog servo loop as hereinafter described in more detail. In addition, the clock 22 causes the reference counter 24 to cyclically and periodically sweep through a digital number scale of 0 to 999.

From the foregoing it can be seen that both the position register 18 and the reference counter 24 receive digital quantities, the position register 18 receiving all bits of periodically occurring position numbers and the reference counter 24 being advanced by means of clock 24 to cyclically traverse a digital scale of 1,000 counts. The numbers which appear in the registers 18 and 24 are of the same numerical form, that is, they are either both binary or both BCD and both appear at a rate of 200 per second. Therefore, once during the existence of any given position number in register 18 there will be in reference counter 24 a digital quantity which is equal to the position number, the occurrence of this condition of equality within any given one two-hundredths of a second interval depending upon the absolute value of the number in the position register.

Position register 18 is provided with 10 output lines, one for each digit position, and the reference counter 24 is similarly provided with 10 output lines again, one for each digit position. The output lines of both the position register 18 and the reference counter 24 are connected to opposite inputs of a digital comparator 26 which produces an output on an output line 27 whenever all of the digits of register 18 are identical to correspondingly positioned digits in the counter 24. Accordingly, signals appear on line 27 at a nominal frequency of 200 pulses per second but of a variable phase or time spacing depending upon the absolute values of the sequence of numbers input to the position register 18 by the computer 16 in response to the digital data read from tape 14.

The train of signal pulses on line 27 is applied to the "set" input of a flip-flop 28 which forms part of a conventional phase-analog servo loop as will be apparent to those of ordinary skill in the art from the following description. The "reset" input of flip-flop 28 receives output signals from the resolver 36 the phase of which signals are an indication of the changing position of the controlled element, in this case, a tool slide. A squaring circuit 42 is preferably employed to shape the essentially sinusoidal output of the resolver 36 into a square waveform which is suitable for application to a convention flip-flop. The output of the flip-flop 28 which is essentially a square or rectangular waveform of variable symmetry is applied to a level standardizing circuit 30 which introduces a dc bias causing the square or rectangular waveform from the flip-flop 28 to be symmetrical in amplitude about 0 volts. The level standardized output from the circuit 30 is applied to a filter which extracts the dc or average value of the square waveform and applies this dc or average value as an error signal to an amplifier 33 which drives a tool slide motor. The motor 34 operates in the conventional fashion to control the position of a tool slide along a selected axis of displacement. A substantially closed loop is formed by tool slide motor 34, the tool, the resolver 36, the flip-flop 28, the level standardizing circuit 30, and the filter 32. As will also be apparent to those of ordinary skill in the art, the filter 32 is essentially an RC network. If both the positive and negative portions of the level standardized waveform from the flip-flop 28 are equal, the dc value of this signal is zero and the tool slide motor 34 is stationary. However, if the position portion is of greater duration than the negative portion, a net positive signal is derived by the filter 32 and applied to the tool slide motor 34 to advance the slide in the positive direction. Conversely, if the negative portion of the level standardized squarewave is of greater duration than the positive portion, a net negative signal is applied to the tool slide motor 34 to advance the tool slide in the opposite or negative direction. The positive, zero, or negative quality of the error signal from filter 32 depends upon the time spacing or phase relationship of the pulses which are applied to the flip-flop 28 from the comparator 26.

In order to prevent the computer 16 from loading a new position number or the equivalent of an old position number into the register 18 during a compare function, an interrupt signal to the computer is derived from the output of the comparator 26 by means of a line 44 which includes a delay network 46. The line 44 functions to produce an interrupt signal to the computer 16 which is interpreted as approval to load a new position number into the register 18.

Referring to FIG. 2, a waveform 48 illustrates the 200 cycle per second output of the reference counter 24. By the superimposed numbers it can be seen that a full cycle of a reference counter is equivalent to a count of 1,000 in the counter 24, the intermediate numbers being linearly proportional thereto. Assuming a zero feedrate is to be accomplished the computer 16 respond to a zero feedrate signal from tape 14 or, more likely, to the absence of additional data to produce a given position number representing the last desired tool slide position and to repeatedly load this number into the position register 18. As an example, it is assumed on the line 50 of FIG. 2 that the position number 200 is repeatedly loaded into the position register 18 by way of line 20. Comparator 26 compares the number 200 to the reference counter contents and generates a pulse 52 on line 27 once during each complete cycle of the reference counter waveform 48. Because the position number is unchanging the pulses 52 occur with a constant spacing, that is, with a constant phase relationship. Accordingly, the flip-flop 28 is set at the same time during each one two-hundredths of a second interval and as soon as the phase analog loop settles out to a zero error condition, is reset 180° out of phase with the set pulses 52. Accordingly, the tool slide motor 34 is idle and the controlled element remains in a position which corresponds to the position number 200.

From the foregoing it is apparent that the digital position quantities in the form of position numbers are not simply pulses which have no quantitative significance and which in the prior interpolator system typically occur aperiodically, but whole numbers which can be related to machine slide position, each position number cycle of 1,000, for example, representing one-tenth of an inch of machine slide displacement. This scale presumes that one resolver revolution corresponds to 1,000 pulses.

Referring to line 54 of FIG. 2, the positive feedrate condition is illustrated. In this condition the sequence of position numbers is regularly decremented so that, for example, position numbers occur in the sequence 200, 50, 900, 750, 600, 450, 300, etc. From FIG. 2 it can be seen that the pulses 56 occur earlier and earlier in the reference counter periods since the position numbers in register 18 which give rise to those pulses are numerically equivalent to the contents of the periodically cycling reference counter 24 earlier and earlier within the reference counter cycles.

The negative feedrate condition is illustrated on line 58 wherein pulses 60 are produced by the comparator 26 in response to a sequence of position numbers such as 200, 350, 500, 650, 800, 950, 100, etc. Since the position number in register 18 is progressively increasing, each successive position number is equal to the reference counter number progressively later in each reference counter interval. From the foregoing it can be seen that the phase of the pulses on line 27 is variable either positively or negatively in finite amounts simply by outputting from computer 16 a sequence of position numbers which sequence includes incremental position number variations of either negative or positive sign.

It will be understood that system 10 typically is applied to the control of more than one axis of displacement and as such for each additional axis of displacement, an additional position register 18 is required along with an additional comparator 26 and an additional phase analog servo loop including its own flip-flop level standardizing filter circuit, tool slide motor, resolver, and squaring circuit.

The computer 16 is preferably a general-purpose digital computer, such a device being well adapted for the processing of digital data quantities within a numerical control application. In the system 10, computer 16 receives from tape reader 12 signals for specifying the desired $\Delta X$ and $\Delta Y$ motions (assuming two axis of displacement) and a feedrate number specifying the desired feedrate in inches per minute. As will be apparent to those of ordinary skill in the art, the $\Delta X$ and $\Delta Y$ quantities are vector quantities wherein the feedrate is a scalar or nonvector quantity. From this information, the change in position number $\Delta PN_x$ is calculated according to the following formula:

$$\Delta PN_x = \frac{1000 \times \Delta X \times FR}{60 \times P \times C \sqrt{\Delta X^2 + \Delta Y^2} + \Delta X \times FR}$$

Where $C$ is system clock rate, $P$ is command pulse value (typically 0.0001 inch), and $FR$ is programmed feedrate in inches per minute.

Following this calculation the distance to go ($\Delta X_r$) is calculated. If this quantity is zero, the X-axis motion is complete and no further calculation is necessary. However, if it is non-zero, the distance to go is compared to the change in the position number. If the distance to go is greater than the change in the position number, then a new position number equal to the old position number plus the change in the position number is generated. On the other hand, if the distance to go is equal to or less than the change in the position number, then a new position number is generated which is equal to the old position number plus the distance to go. In either case, the new position number is compared with the maximum reference counter and position register capacity, which in this case is 1,000, to determine whether the position number is greater than or equal to 1,000. If it is greater than or equal to 1,000, the quantity 1,000 is subtracted from the position number and if it is less than 1,000 no arithmetic operation is performed. Following this operation the new position number is compared to zero and if it is less than zero 1,000 is added to the number. At this point a logic operation typically known as a decision step is executed to determine whether the interrupt signal on line 44 has occurred and if it has not, no position number is output to the register 18. However, if an interrupt signal has occurred, a new position number is output to the position register 18. From this point a new distance to go is calculated by adding the old distance to go to the change in the position number and the operation is recycled.

It will be understood that various changes and modifications in the illustrated embodiment are possible and will occur to those of ordinary skill in the art upon appreciation of the teaching herein. Accordingly, it is to be understood that the foregoing description is illustrative in character and is not to be construed in a limiting sense.

The embodiments of the invention in which an exclusive property or privilege is claimed are defined as follows:

1. In a numerical control system for controlling the displacement of an element along at least one axis: means for generating digital position quantities in a sequence which represents the desired displacement of the element; means for comparing the digital position quantities to a periodically varying reference quantity and for generating a signal whenever a predetermined relationship exists between the position and reference quantities; and displacement control means receiving the signals and responsive to the time spacings therebetween to control displacement of the element.

2. Apparatus as defined in claim 1 wherein the means for generating digital position quantities includes a digital computer.

3. Apparatus as defined in claim 2 including a tape reader connected in input relation to the computer for reading program data into the computer.

4. Apparatus as defined in claim 1 including clock means controlling said means for generating such that the digital position quantities occur at least substantially periodically.

5. Apparatus as defined in claim 4 wherein the position quantities are whole numbers within a predetermined numerical range, the means for comparing including a register for receiving said whole numbers in sequence.

6. Apparatus as defined in claim 5 including means for clearing the register between the occurrence of position numbers in the sequence.

7. In a numerical control system for controlling the displacement of an element along at least one axis: means for generating a sequence of digital position quantities representing the desired displacement of the element; means for cyclically and periodically generating digital reference quantities traversing a fixed scale; means for comparing the digital displacement quantities to the digital reference quantities and generating a sequence of signals wherein each signal occurs whenever a predetermined relationship exists between the quantities; and displacement control means responsive to the phase relationship between the signals in said sequence of signals to cause displacement of the element.

8. Apparatus as defined in claim 7 wherein the means for generating digital position quantities includes a digital computer.

9. Apparatus as defined in claim 8 including a tape reader connected in input relation to the computer for reading program data into the computer.

10. Apparatus as defined in claim 7 including clock means commonly controlling the respective means for generating the position and reference quantities.

11. Apparatus as defined in claim 7 wherein said position and reference quantities are multibit digital numbers within a predetermined numerical range said means for comparing comprises a register for receiving said sequence of position quantities, and a comparator for simultaneously comparing bits of the reference quantities to correspondingly ordered bits of the position quantities.

12. Apparatus as defined in claim 7 wherein the displacement control means includes a phase-analog servo loop.

13. A method of numerically controlling the displacement of an element along at least one axis comprising the steps of: generating a periodic sequence of digital position numbers within a predetermined numerical range, converting the sequence of numbers into a pulse train wherein the time spacings of the pulses are related to the numerical intervals between the numbers in the sequence, and applying the pulse train to a phase-analog servo loop for controlling displacement of the element.

14. The method of claim 13 wherein the step of generating includes the substep of reading displacement characters from a stored program into a digital computer.

15. The method of claim 13 wherein at least two consecutive digital position numbers are equal whereby the time spacings between at least three consecutive pulses in the pulse train are equal.

16. The method of claim 13 wherein the digital position numbers increase cyclically within said range by a given numerical increment whereby the time spacings between pulses in the pulse train increase.

17. The method of claim 13 wherein the digital position numbers decrease cyclically within said range by a given numerical increment whereby the time spacings between pulses in the train decrease.

* * * * *